TUNED SEISMIC WAVE COMMUNICATION SYSTEM
Filed Dec. 3, 1962 5 Sheets-Sheet 1
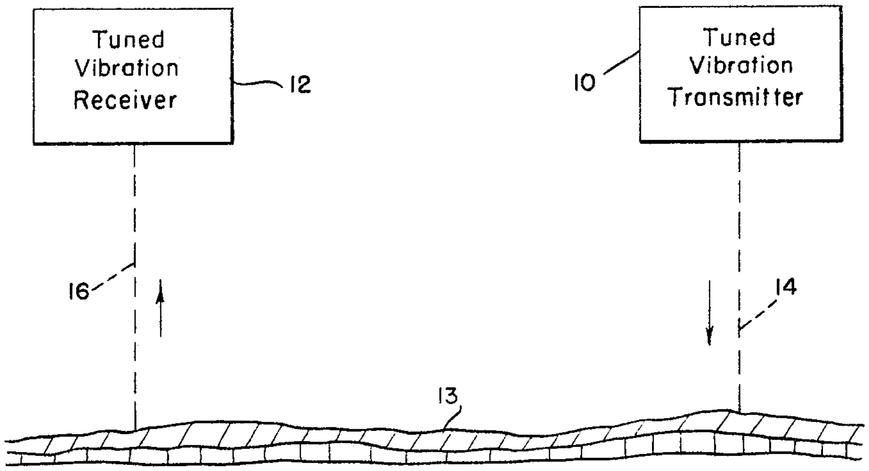
Fig. 1
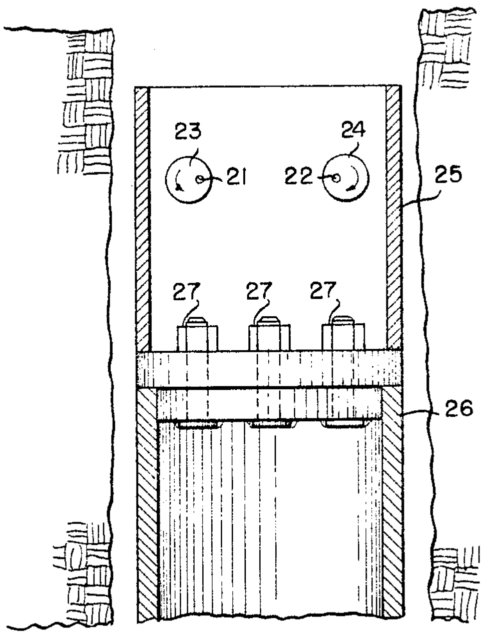
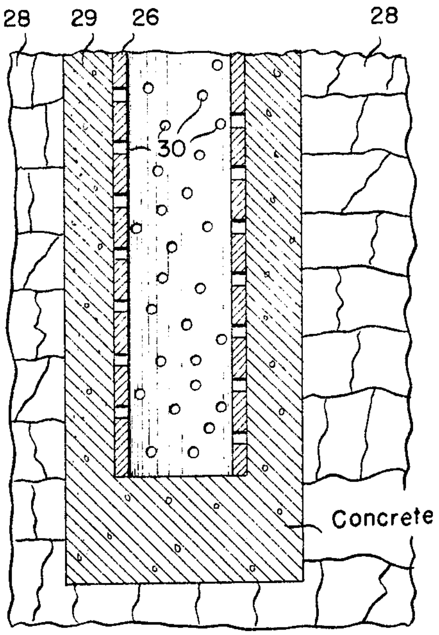
Fig. 2A Fig. 2B
INVENTOR
Leland S. Hobson
BY Strauch, Nolan & Neale
ATTORNEYS

TUNED SEISMIC WAVE COMMUNICATION SYSTEM

Filed Dec. 3, 1962 5 Sheets-Sheet 2

INVENTOR
*Leland S. Hobson*

BY Strauch, Nolan & Neale
ATTORNEYS

TUNED SEISMIC WAVE COMMUNICATION SYSTEM

Filed Dec. 3, 1962 5 Sheets-Sheet 3

INVENTOR
Leland S. Hobson

BY [signature]

ATTORNEYS

TUNED SEISMIC WAVE COMMUNICATION SYSTEM

Filed Dec. 3, 1962 5 Sheets-Sheet 4

INVENTOR
Leland S. Hobson

BY Strauch, Nolan & Neale
ATTORNEYS

INVENTOR
*Leland S. Hobson*

BY Strauch, Nolan & Neale
ATTORNEYS

United States Patent Office 3,273,112
Patented Sept. 13, 1966

3,273,112
TUNED SEISMIC WAVE COMMUNICATION SYSTEM

Leland S. Hobson, 508 Wickham Road, Manhattan, Kans.

Filed Dec. 3, 1962, Ser. No. 241,704
1 Claim. (Cl. 340—15)

The present invention relates to communication systems, and more particularly to a communication system that utilizes the crust of the earth as a wave propagating medium.

Seismic wave propagation use in the solid earth for information transfer has been considered for military communications requirements. With seismic communications systems the entire system may possibly be underground. Hence, they may provide a hard backup communications link, relatively invulnerable to general nuclear attack and difficult to jam. Theoretical studies, engineering analyses and filed experiments have been performed to study seismic wave propagation. It has been determined that communications to several hundred kilometers can be achieved with the present state of the art as by transmission of a limited number of bits of information utilizing 10 to 1000 lb. explosive charges. Transmission time is controlled by the velocity of the seismic waves depending upon the geological formation of the crust through which the transmission takes place.

A primary object of this invention is to provide a novel groundbased communication system and methods that utilize the earth's crust, or certain strata therein, as the wave propagating medium.

It is another object to provide a system and method wherein waves of a single frequency are transmitted and the receiver station is selectively tuned to the frequency of the frequency of the transmitted waves. Such a system may be realized by providing a tuned transmitter for producing physical vibrations, such as sound waves or seismic waves at a selected frequency $f(o)$, the transmitted waves being keyed on and off or otherwise modulated with intelligence, and a receiver that is resonant or sympathetic to the same frequency $f(o)$, the receiver including means for detecting the transmitted intelligence. The frequency $f(o)$ is selected for the most efficient transmission of vibrations through the particular crust or rock stratum available and to best conform to the requirements of a particular communication situation, as for example the avoidance of frequencies assigned to the other stations.

A still further object is to provide a novel means for coupling the transmitter and the receiver to the earth's crust, rock stratus or the like which serves as the transmission medium, with the transmitter and receiver being installed directly on or otherwise coupled by connecting links to the transmission medium. Thus, if it is desired to have either of the transmitter or receiver remote from a transmitting rock stratum, the coupling means may be buried to have one end installed directly in the rock stratum.

These and other objects will become more fully apparent from the claims, and from the detailed description as it proceeds in connection with the accompanying drawings wherein:

FIGURE 1 is a block diagram illustrating the system and method of the present invention;

FIGURES 2A and 2B are elevation views in section of the top and bottom portions respectively of one form of tuned vibration transmitter for the system of FIGURE 1;

Figure 2C:
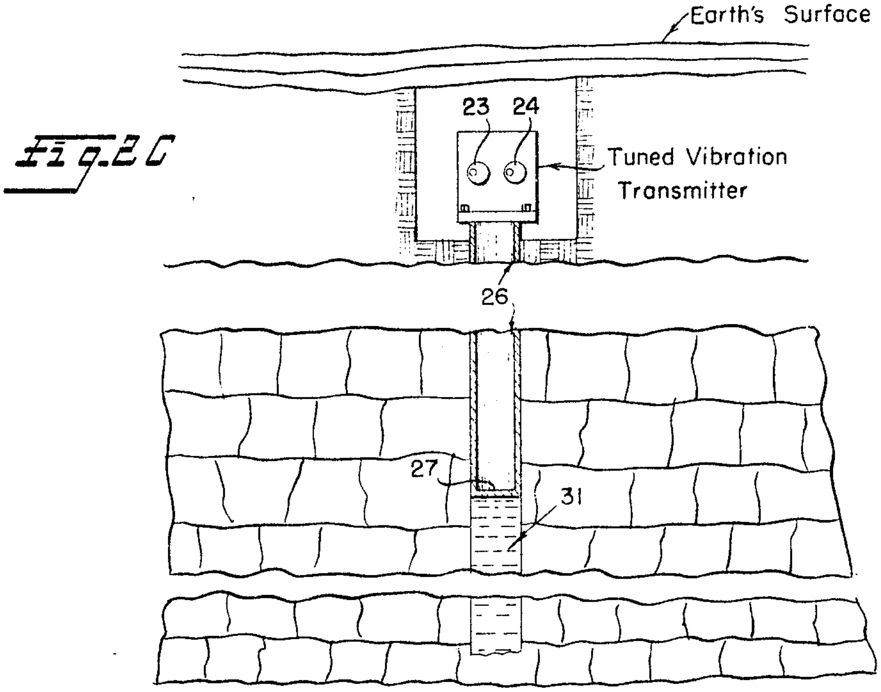
FIGURE 2C is an elevation view in section of another form of tuned vibration transmitter.

Referring now to FIGURE 1, the system includes a tuned vibration transmitter 10 for producing physical vibrations such as sound waves or seismic waves at a selected frequency $f(o)$ and a vibration receiver that is resonant to the frequency $f(o)$. Any suitable type of vibration generator capable of producing vibrations at a subsonic, sonic or supersonic frequency may be used, the point being that a continuous wave train is used as distinguished from a single impulse or a series of separate impulses resulting, for example, from explosive shots or other blasts or dropping of weights that are each composed of a broad spectrum of frequencies. One such generator suitable for use in the system of the present invention is shown in United States Patent No. 2,975,846 issued March 21, 1961, to A. G. Bodine, Jr.

The system of the present invention also includes a receiver 12 which may comprise a geophone or other transducer together with suitable amplifiers and narrow band pass filters tuned to be sympathetic with the transmitted frequency and to exclude other frequencies. One such receiver type is shown in United States Patent No. 2,521,130, issued September 5, 1950, to Scherbatskoy.

Both transmitter 10 and receiver 12 may be part of communication stations for surviving a military attack. Physical vibrations or seismic waves from the transmitter 10 are transferred to a rock stratum 13 in the earth's crust as by a connecting link 14. A similar connecting link 16 may be provided to couple the transmitted frequency from rock stratum 13 to the vibration receiver 12. FIGURE 1 shows transmitter 10 and receiver 12 connected to the same rock stratum 13 but satisfactory operation may often be obtained when they are connected to different rock strata.

The stations may be located at some depth underground if desired, and may be adjacent to a suitable rock stratum or at some distance from it. In either case coupling links 14 and 16 are provided so that the vibratory energy is transmitted to and from the transmission medium.

Where two way communication is desired, each station will have both a transmitter and a receiver. At each station, both the transmitter and the receiver may use the same connecting link to rock strata, or rock stratum at different depths may be used for transmission and for reception. The transmitting and receiving station may be separated by some distance, which may vary from less than a mile to many miles or hundreds of miles, depending upon the power and sensitivity of the equipment used. Proper directional adjustment of the transmitter and/or receiver will further improve the efficiency of the system.

The transmitter 10 for the system shown in FIGURE 1 illustrated in FIGURE 2A may comprise a pair of shafts 21 and 22, which are rotated in opposite directions at the same speed by any suitable driving motor. A pair of offset weights 23 and 24 are carried by shafts 21 and 22, respectively, with shafts 21 and 22 being journalled in housing member 25 to impart a vertical vibration thereto at a single frequency $f(o)$. Housing member 25 may be mounted to the upper end of a column such as a steel beam or a well casing 26 as by a plurality of fasteners 27, such as bolts and nuts, rivets or the like.

The entire transmitter may be located below ground level or the column may extend from above ground level to a rock stratum or other underground geological formation which serves as the transmission medium.

Well casing 26 may be placed in position on rock stratum 28 as shown in FIGURE 2B by drilling a hole 29 of suitable depth to the desired rock stratum and inserting casing 26 into physical contact with stratum 28. In FIGURE 2B the lower portion of hole 29 is illustrated as being filled with a hardened substance such as concrete. The lower portion of casing 26 is provided with apertures 30 or other openings to firmly anchor the lower end of casing 26 into the body of concrete. Well casing 26 thus serves as a coupling link for transferring the vibrational waves generated as weights 23 and 24 are rotated, into rock stratum 28. The frequency of the generated waves is determined by the speed of rotation of shafts 21 and 22 which may be controlled in any conventional manner. Other coupling links such as columns having a solid channel or I-beam-shaped cross-sections may be used instead of well casing 26 for transferring vibrational waves into the rock stratum.

In FIGURE 2C, an embodiment is illustrated where the well casing 26 with closed bottom 27, connects with an open hole which is filled with water 31 and the revolving offset weights 23 and 24 are suitably coupled to transmit the vibrational energy to the top of the water column through casing 26 with the closed pipe casing 26 and water 31 serving as part of the coupling link for transferring the vibrational waves into the rock stratum.

Figure 3:
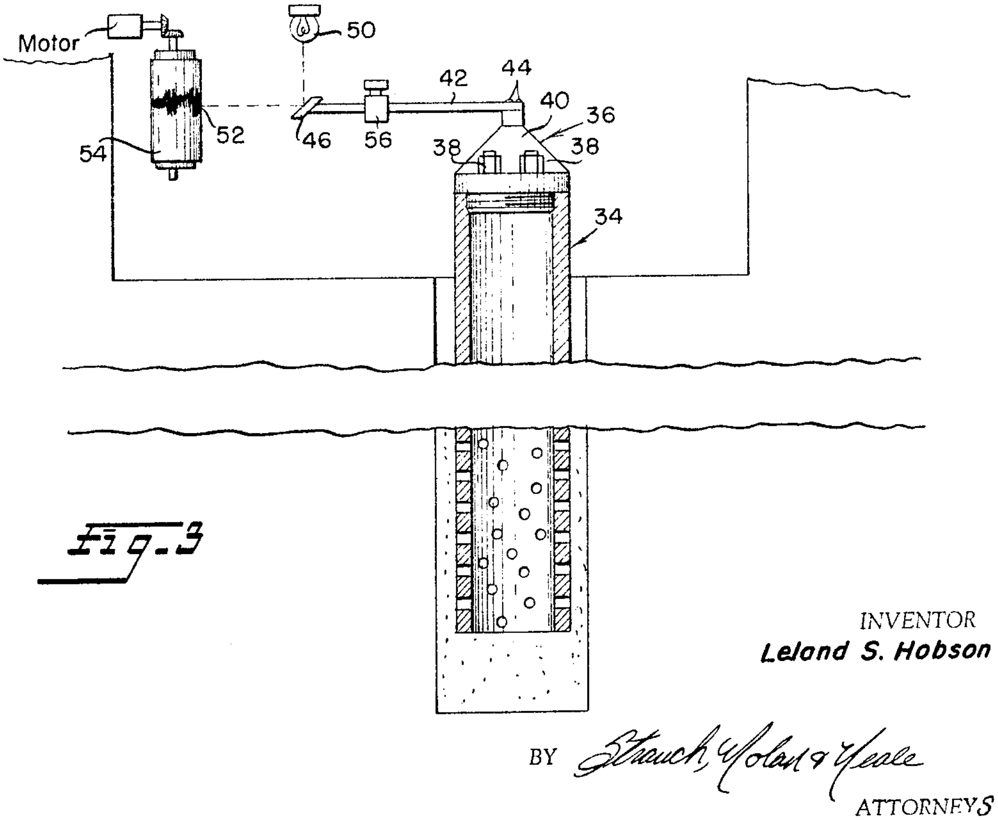
FIGURE 3 is an elevation view, partially in section of one form of tuned vibration receiver adapted for use with one of the transmitters of FIGURE 2.

Referring now to FIGURE 3, the receiver station may comprise a well casing 34 that is similar to well casing 26 of FIGURE 2B and which has a mechanical vibration receiver 36 physically connected at the upper end of casing 34 as by bolts 38. Receiver 36 may be constructed of a rigid bracket 40 to which a vibrating reed 42 is cantilever mounted as by fasteners 44. A mirror 46 is secured to the outer free end of reed 42. Reed 42 with mirror 46 is tuned to be resonant at the transmitted frequency. Light from lamp 50 is reflected by mirror 46 to a light sensitive paper or other record medium 52 that may be guided around drum 54 and driven by a suitable motor in accordance with conventional recording techniques.

One method of operation of the system in accordance with the system of the present invention is to transmit signals by use of a signal code similar to the telegraphic or Morse code, that involves transmitting a series of vibrations at a selected frequency rate $f(o)$ corresponding to dots and dashes with a discontinuity between adjacent ones of the dot and dash signals to thereby provide a recording on the recording medium 52 that can be interpreted into intelligent information.

The receiver of this embodiment may be tuned by the adjustment of the position of a weight 56 along the length of reed 42. The use of the tuned reed and reasonably long coded signals will provide a receiver having a reasonably high sensitivity and good ability to distinguish between transmitted signals and background noise signals.

It is apparent that well casing 34 of FIGURE 3 could be closed and placed over a hole filled with water as in the coupling link illustrated in FIGURE 2C and the transmitted vibrations passing through rock stratum 28 coupled to cause vibration of reed 42 by the combination of well casing 34 and the water below it.

Figure 4:
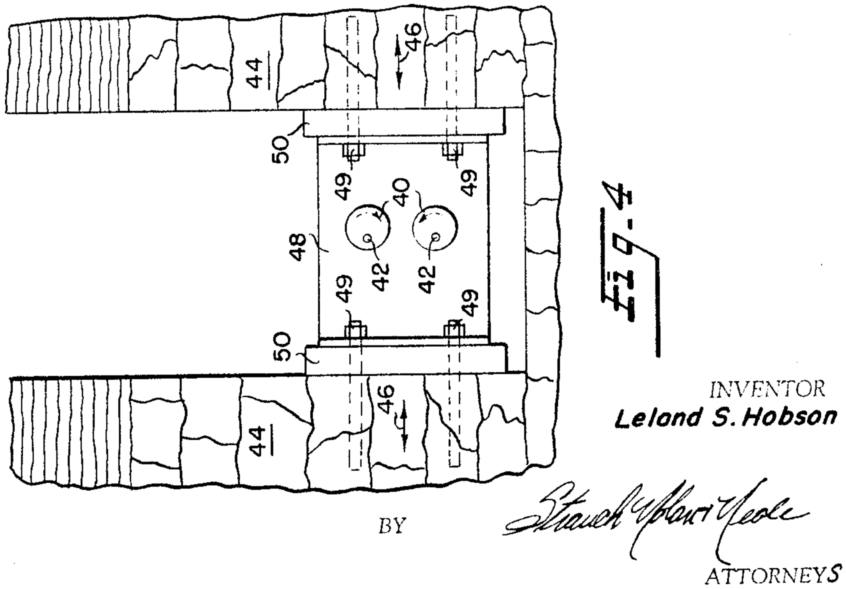

Referring now to FIGURE 4, there is here illustrated a transmitter of the type shown in FIGURE 2A but mounted with offset weights 40 on two parallel shafts 42 which are arranged to lie in a vertical plane and hence produce a vibrational force which is in the general direction of the rock stratum 44 as indicated by arrows 46. A bracket member 48 through which shafts 42 are journalled for rotation, is connected as by threaded bolts and nuts 49 for vibrational transmission into stratum 44 through plates 50 which are of suitable thickness to have the requisite rigidity to provide a mounting for bracket 48 which is effective to transmit efficiently the generated mechanical vibrations into rock strata 44. Plates 50 are not essential to the invention, but may be used for ease of construction or other purpose.

Such a transmitter and coupling arrangement as illustrated in FIGURE 4 will have a much greater directivity for its transmitted signal since the vibrations are transmitted primarily in one direction rather than being radially dispersed as in the embodiment of FIGURES 2A and 2B. Improved directional advantage in the communications system may also be obtained by carefully adjusting the rotational position of the equipment either horizontally or vertically so that the generated signal is oriented to travel toward the receiving station. Also, the impact point of the vibrator or generator at the transmitting end is here designed to be at the location of rock stratum 44 so as to increase the range of the system.

Figure 5:
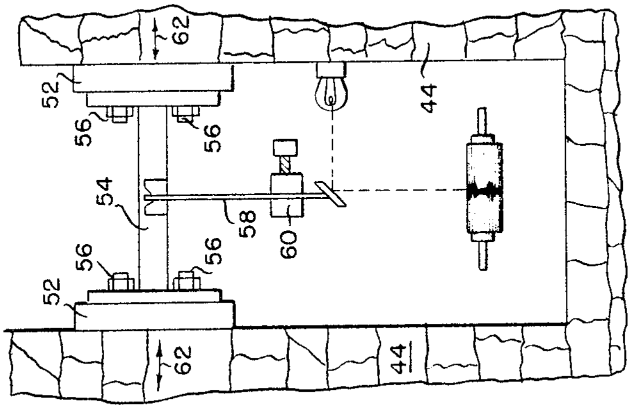
FIGURES 4 and 5 are elevation views in partial section showing a second form of tuned vibration transmitter and receiver respectively.

In FIGURE 5, the receiver station is illustrated as being mounted in the same stratum 44 as the transmitter of FIGURE 4, and as being coupled to rock stratum 44 as by means of spacing plates 52 to which bracket member 54 is secured as by fasteners 56. Sympathetic vibrations are thus established in reed 58, the natural frequency of which may be adjusted by the movement of weight 60 to correspond with the frequency of the transmitted signal, and the same light, mirror and recording medium used as was described in connection with the receiver embodiment of FIGURE 3. The take off for the sensing device at the receiver station of FIGURE 5 may be rotated in a horizontal plane about the vertical axis of the hole and in a vertical plane about the longitudinal axis of member 54 to thereby be positioned to obtain the maximum energy transfer from the transmitter station of FIGURE 4, which is presumed to arrive at the receiving station in the direction of arrows 62.

Figure 6:
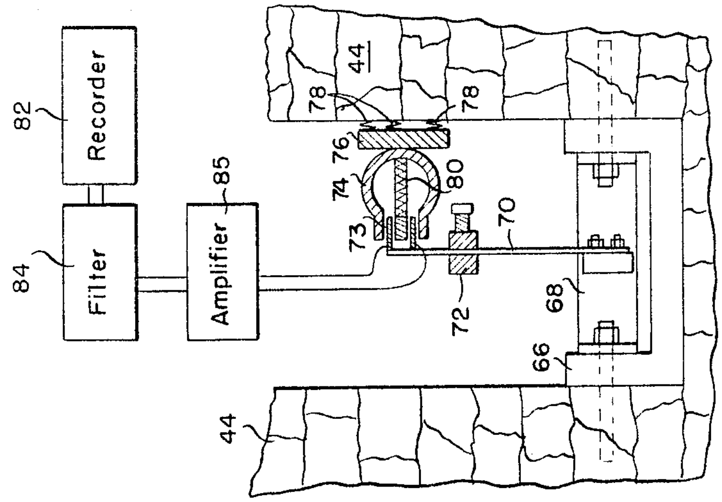
FIGURE 6 is an elevation view in partial section of a modified tuned vibration receiver adapted for use with the transmitter of FIGURE 4.

A further receiver station embodiment is illustrated in FIGURE 6 which is mounted within a hole or opening in rock stratum 44. Mounting base 66 is provided to attach bracket 68 physically with rock stratum 44. A vibrating reed 70 with weight 72 is mounted as in the embodiment of FIGURE 5, but the transducing element is here shown to include a coil 73, mounted on the free end of reed 70. A permanent magnet 74 is mounted on a heavy mass 76 which is suspended as by coil springs 78 to be insensitive to the vibrations transmitted through stratum 44. Magnet 74 may have a center leg 80 which extends into coil 73 on the end of reed 70 to thus provide a magnetic field which is cut by the windings of the coil as reed 70 vibrates. The voltage generated in the coil is thus amplified and rendered intelligible as by being recorded in recorder 82. Suitable electrical filter(s) 84 may also be utilized between the output of the amplifier 85 and the input of recorder 82, to further increase the sensitivity and separate the desired signals from background noise and vibrations at frequencies other than the frequency to which reed 70 is sympathetic.

Figure 7:
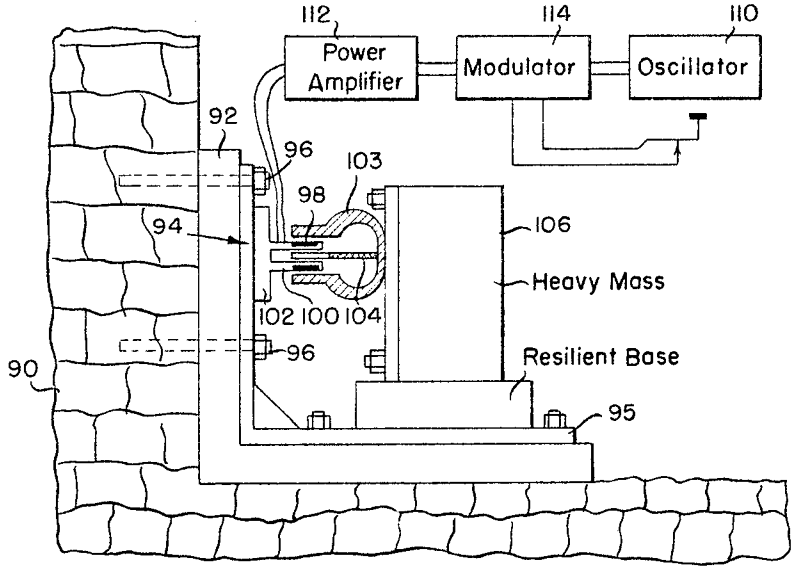
FIGURES 7 and 8 are similar views of yet another form of transmitter and receiver in accordance with the present invention.
Figure 8:
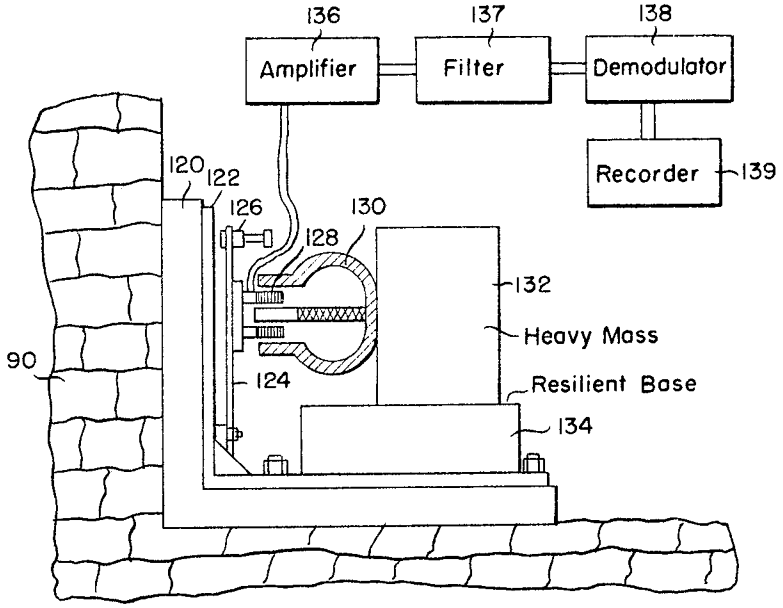

A further embodiment of the communication system in accordance with the present invention is shown in FIGURES 7 and 8 taken together. In FIGURE 7, a transmitter is illustrated which is mounted in an opening in rock stratum 90 by a mounting base 92 that in turn carries a vibratable armature 94 that is secured by suitable fasteners 96 which may extend for some distance into a stratum 90. Omitting coupling base 92 does not essentially change the operation if a solid connection is maintained between armature 94 and rock strata 90. the armature coil 98 may be mounted on a cylindrical sleeve 100 having a base 102 that is rigidly secured as by rivets to bracket shaped portion 94 of the armature. The magnetic member 103 and central pole piece 104, which may either be a permanent magnet or an electromagnet having a substantially uniform magnetic field, are secured rigidly to a heavy mass 106 which is at least one and preferably several orders of magnitude larger than the mass of the armature 94. Mass 106 may be mounted on a resilient base 108 to be effectively decoupled from the vibrations of armature 94, and in this embodiment, is shown as being supported on a horizontal portion 95 of armature 94.

The electrical current supplied to coil 98 may be in the form of oscillations generated by an electrical oscillator 110 and amplified by power amplifier 112. Modulator 114 may be effective to key power amplifier 112 on and off, or may be used to provide amplitude modulation to the electrical signals supplied to coil 98 as is common in electrical communication systems. In this embodiment, the transmitter produces a physical traveling wave through rock stratum 90 that is modulated according to some order of intelligence, as for example the Morse code. The transmitter is in effect a vibration generator of the general type used in vibration laboratories and often referred to as exciters. These generators have been built for frequencies up to the top of the sonic range or on into ultrasonic frequencies and the frequency rate is controlled electrically by the frequency of oscillator 110. It is also desirable to design the movable portion of armature 94 so as to exhibit resonance at the frequency of oscillator 110 in order to increase the effective strength of the signal. Such a transmitter arrangement has an inherent advantage of being highly directional.

Referring now to FIGURE 8, the receiver station may comprise a mounting base 120 solidly connected to the side wall of an opening in rock stratum 90 to which a bracket 122 is connected to transmit the vibrations received at the receiver station to vibrating reed 124 which, as before may be tuned to the incoming frequency by an adjustable weight 126 and which carries a winding 128 that is moved in the field of magnet 130. Magnet 130 is mounted on the heavy mass 132 which is effectively decoupled from the transmitted vibrations as by a resilient base 134. The electrical signals generated in winding 128 may be supplied to an amplifier 136, the output of which is passed through an electrical filter 137 to the demodulator 138. The output from demodulator 138 may be applied to any suitable transducer including recorder 139.

A method of operating the system illustrated in FIGURES 7 and 8 includes the transmission of signals by use of a code utilizing the selected frequency as a carrier wave and modulating the wave form at the transmitter in any manner that is conventional in the electrical communication arts. The tuned receiver is adapted to pick up the transmitted frequency carrier wave, separate out the modulated wave from the carrier wave, and interpret the modulated signal according to the code that is used.

Figure 9:
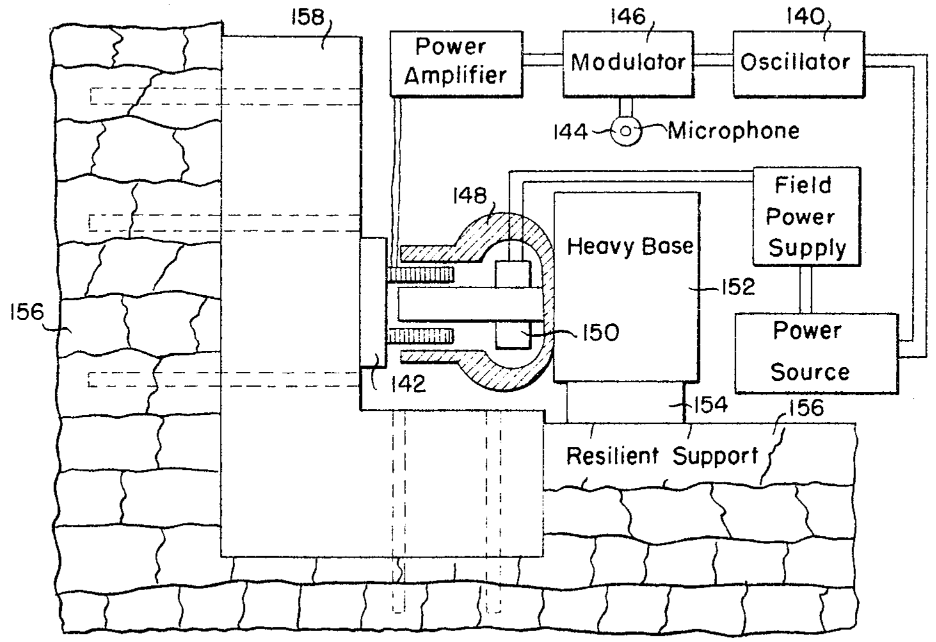
FIGURES 9 and 10 are similar views of a voice modulated transmitter and receiver system in accordance with the present invention.
Figure 10:
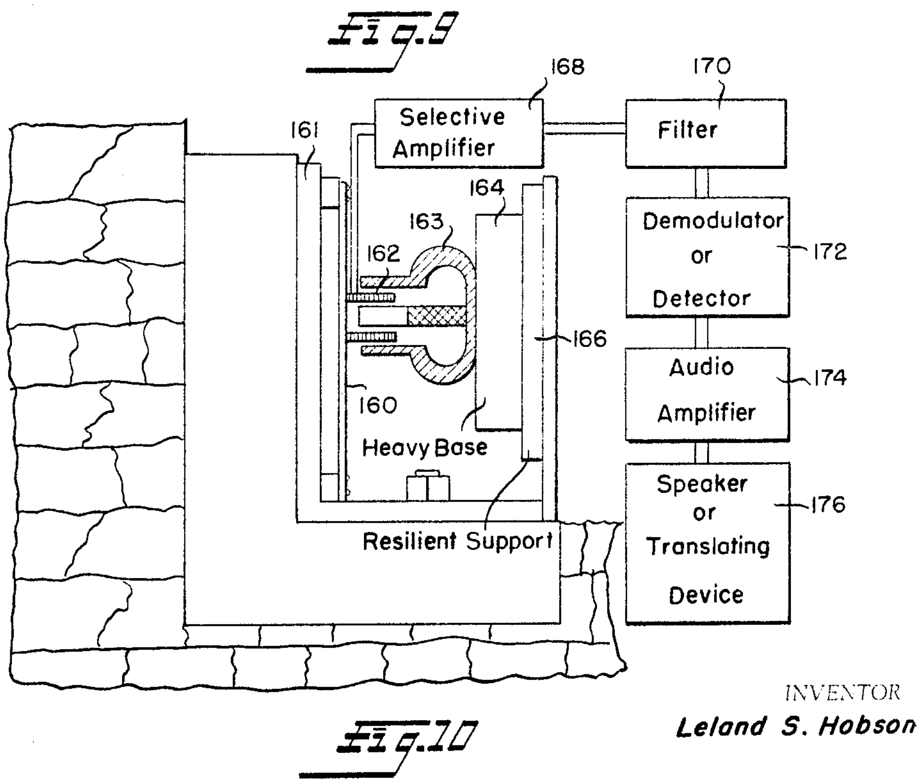

Referring now to the embodiment of the communication system shown in FIGURES 9 and 10, the transmitter shown in FIGURE 9 contains an oscillator 140 for driving the armature 142 at the selected carrier frequency and a microphone 144 for controlling modulator 146 to superpose a voice modulation on the transmitter carrier wave. The permanent magnet member 148 may contain a coil 150 energized from the power supply and be supported on the heavy base 152, which rests on a resilient mounting 154 which in this embodiment is shown to rest directly on rock stratum 156. Physical vibrations of armature 142 may be transmitted to rock stratum 156 by direct mounting of the armature on the wall of the rock stratum or by mounting on a suitable support, not shown, which enhances transmission of the armature vibrations.

In the receiver station for the embodiment shown in FIGURE 10, the vibrating reed member 160 is mounted at both ends to bracket 161 to have a higher natural frequency than in the other embodiments and carries at its center a lightweight coil 162, adapted to move in the field of magnet 163 which in turn is supported on a heavy base 164. Base member 164 is effectively isolated from the transmitted vibrations as by resilient base 166.

The method of operation of the embodiment shown in FIGURES 9 and 10 involves transmission of the human voice by using a selected frequency as the carrier wave in the ultrasonic frequency range or in the upper part of the sonic range, and modulation of the carrier wave with a voice frequency signal. This transmission results in a voice amplitude modulated wave passing through the rock stratum to a sympathetically tuned receiving station where the voice wave is separated from the carrier wave and reproduced in any conventional manner.

The electrical signals generated in coil 162 are applied to the input of amplifier 168 before being applied to filter 170. The output from filter 170 is connected to a demodulator or detector 172 which then feeds an audio amplifier 174, and the output may then be applied to a speaker or other suitable translating device 176.

In many of the embodiments, the coupling link or member for connecting the vibrations from the generator to the signal transmission medium is an important, though not necessarily essential, component of the system. The dimensions and materials for the coupling link are advantageously selected to cause effective transmission of vibrational energy at the desired frequency for transmission. It is also possible in some embodiments to choose the size, shape and materials of the coupling member to have a natural frequency that is equal to the generated frequency that is transmitted. This is important in the transmitter station to increase the range of the transmitted signal. Such an arrangement in the receiver station serves as a mechanical filter for discriminating against vibrations of the frequencies that differ from the desired transmitted frequency. The vibrating reed of the receiver stations also serves to provide improved sensitivity for transmission of the desired frequency and to decrease the sensitivity of the reciever station to frequencies other than the transmitted frequency.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claim are therefore intended to be embraced therein.

What is claimed and desired to be secured by Letters Patent is:

A communications system utilizing the earth's crust as the transmitting medium comprising in combination (a) a generator for producing physical vibrations at a predetermined frequency selected to be capable of transmission through said transmitting medium;

(b) coupling means connecting said predetermined frequency vibration generator to said transmitting medium at a first position;

(c) a receiver tuned to be sympathetic to said predetermined frequency vibrations, said receiver comprising a reed member mounted and tuned to be resonant to said predetermined frequency, a coil mounted to move with said reed, means providing a magnetic field at said coil, said magnetic field having sufficient strength to produce an alternating current signal in said coil in response to vibration of said reed, and means for detecting the alternating current in said coil; and (d) coupling means located at a second position remote from said first position connecting said receiver to said transmitting medium for transmitting said predetermined frequency vibrations from said transmitting medium to said receiver.

(References on following page)

References Cited by the Examiner

UNITED STATES PATENTS

| | | | |
|---|---|---|---|
| 1,416,550 | 5/1922 | Frank | 181—.5 |
| 1,790,080 | 1/1931 | Stanton | 181—.5 |
| 1,969,537 | 8/1934 | Alexanderson | 181—.5 |
| 2,232,476 | 2/1941 | Ritzmann | 340—15.5 |
| 2,653,220 | 9/1953 | Bays | 340—4 |
| 2,728,405 | 12/1955 | Brant | 181—.5 |
| 2,998,516 | 8/1961 | Lehan et al. | 343—100 |
| 2,999,557 | 9/1961 | Smith et al. | 181—.5 |
| 3,034,594 | 5/1962 | Menzel et al. | 181—.5 |
| 3,066,754 | 12/1962 | Johnson | 181—.5 |
| 3,109,165 | 10/1963 | Bagno | 340—15 |
| 3,164,800 | 1/1965 | Kroenert | 340—5 |

FOREIGN PATENTS 432,916 12/1911 France.

OTHER REFERENCES

Schwartz, Mischa, Information Transmission Modulation and Noise, McGraw-Hill, Brooklyn Polytechnic Institute Series, 1959, page 91 relied on.

BENJAMIN A. BORCHELT, *Primary Examiner.*

CHESTER L. JUSTUS, *Examiner.*

R. M. SKOLNIK, W. KUJAWA, *Assistant Examiners.*